United States Patent [19]

Gamell

[11] 3,935,847

[45] Feb. 3, 1976

[54] COMBINED SUPERCHARGER AND CARBURETION SYSTEM FOR INTERNAL COMBUSTION ENGINE

[75] Inventor: Joseph A. Gamell, Kalamazoo, Mich.

[73] Assignee: Joseph Gamell Industries, Incorporated, Kalamazoo, Mich.

[22] Filed: Mar. 22, 1974

[21] Appl. No.: 453,680

[52] U.S. Cl. .............................. 123/119 CF; 60/325
[51] Int. Cl.[2] .............................. F16D 31/00
[58] Field of Search ... 123/119 C, 119 CF, 119 CA, 123/139 AV; 60/597, 598, 607, 618, 477, 325; 417/406

[56] References Cited

UNITED STATES PATENTS

| | | | |
|---|---|---|---|
| 1,107,853 | 8/1914 | Seery | 60/325 |
| 1,413,419 | 4/1922 | Moss | 123/119 C |
| 2,571,179 | 10/1951 | Alexander | 60/325 |
| 3,264,827 | 8/1966 | Siptrott | 60/325 |

*Primary Examiner*—Charles J. Myhre
*Assistant Examiner*—James D. Liles
*Attorney, Agent, or Firm*—Woodhams, Blanchard and Flynn

[57] ABSTRACT

An internal combustion engine, particularly for use with a vehicle, having a turbine driven supercharger for supplying air to the intake manifold. The turbine is driven by a pressurized liquid, specifically a combustible fuel such as gasoline. The fuel is stored within a conventional storage tank, such as is commonly associated with a vehicle, and is supplied, via a pump, to the turbine for rotatably driving same. In one embodiment, the fuel used to drive the turbine is collected in an intermediate storage compartment which, via an intermediate tube, communicates with a venturi located in the intake manifold for causing fuel to be drawn into and intermixed with the air in the intake manifold. In another embodiment, the pressurized fuel from the pump is supplied, via a separate conduit, to a fuel injection nozzle located upstream of the supercharger.

10 Claims, 6 Drawing Figures

COMBINED SUPERCHARGER AND CARBURETION SYSTEM FOR INTERNAL COMBUSTION ENGINE

FIELD OF THE INVENTION

This invention relates to an improved turbine-driven supercharger system for use on an internal combustion engine and, in particular, to a system wherein the turbine is driven by a combustible fuel used by the engine and wherein the turbine drive system is also used for permitting the supply of fuel to and the intermixing thereof with the inflowing air.

BACKGROUND OF THE INVENTION

It has been geenrally recognized by many engine designers that supercharging is one of the more effective ways of improving engine performance, particularly the power output of an engine. However, most prior attempts at using supercharging have utilized a turbine for driving a centrifugal compressor, with the turbine being driven by the engine exhaust gases. While such supercharging systems have produced a noticeable increase in engine output power, they nevertheless have not gained wide acceptance in view of the numerous control problems associated with same, such as the ineffectiveness of the turbine at low engine speeds. Further, under starting conditions, and particularly under cold starting conditions, turbine drives which rely upon exhaust gases are of little, if any, benefit.

In an attempt to improve on the supercharger systems, attempts have been made to utilize different fluids for driving the turbine, specifically freon. However, such a system is disigned to operate as a refrigeration cycle and thus requires that the freon be supplied to a jacket surrounding the combustion chamber for absorbing heat. This system, like the use of exhaust gases, thus relies upon the heat of the engine in order to operate under optimum conditions. This system is also unacceptable under many operating conditions, particularly during starting and warming up of the engine. This system also requires rather elaborate and complex equipment in order for the freon to undergo a proper refrigeration cycle.

Accordingly, it is an object of the present invention to provide an improved turbine-driven supercharger system for use with an internal combustion engine which permits the engine to develop increased power and torque while at the same time providing improved fuel economy. The supercharger system of the present invention also permits quicker cold starting of the engine and faster warmup of the engine since the supercharger system does not rely upon manifold or exhaust heat for the successful operation of same.

It is also an object of the present invention to provide an improved supercharger system, as aforesaid, which permits the gas supplied to the engine to be at a low temperature, which is believed to cause both a significant reduction in exhaust pollutants exhausted and greater volumetric efficiency. Particularly, it is believed that the improved supercharger system of the present invention will reduce all of the major exhaust pollutants, such as carbon monoxide, hydrocarbons and nitrogen oxide. TLhe supercharger system of the present invention, in contrast to conventional engines, will also permit the use of leaner fuel-air mixtures.

A further object of the present invention is to provide an improved supercharger system, as aforesaid, which is combined with the fuel system of the engine to permit fuel to be intermixed with the air in an economical and efficient manner, whereby the conventional complex carburetion system which is normally associated with the engine can be substantially simplified, if not eliminated. Particularly, the system of the present invention permits the elimination of conventional float valves as associated with conventional carburetors, thereby simplifying both the structural and mechanical complexity of the engine.

Still a further object of the present invention is to provide an improved supercharger system, as aforesaid, which utilizes a combustible fuel, and specifically a liquid fuel such as gasoline, for driving the turbine. The fuel for driving the turbine is supplied from a conventional fuel storage tank and is pressurized by means of an intermediate pump. The fuel from the turbine is, in one embodiment of the invention, collected in an intermediate chamber whereby the fuel is drawn through an intermediate tube into a venturi which is located downstream of the supercharger. The intermediate compartment also communicates with the tank for permitting excess fuel to be returned thereto.

Another object of the present invention is to provide a supercharger system which, in accordance with another embodiment, permits the pressurized fuel to be injected into the inflowing air upstream of the turbine, whereby not only is efficient mixing of the air and fuel achieved, but also the overall fuel supply system is substantially simplified.

Other objects and purposes of the present invention will be apparent to persons skilled in this art upon reading the following specification and inspecting the accompanying drawings.

Figure 1:
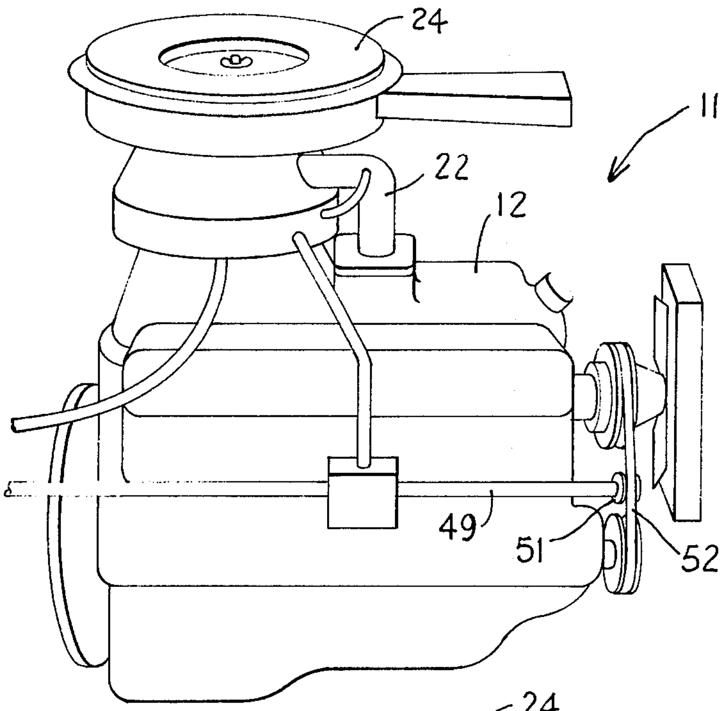
FIG. 1 is a perspective view of an internal combustion engine equipped with a supercharger system according to the present invention.

Certain terminology will be used in the following description for convenience in reference only and will not be limiting. for example, the words "upwardly", "downwardly", "rightwardly" and "leftwardly" will refer to directions in the drawings to which reference is made. The words "inwardly" and "outwardly" will refer to directions toward and away from, respectively, the geometric center of the system and designated parts thereof. Said terminology will include the words above specifically mentioned, derivatives thereof and words of similar import.

SUMMARY OF THE INVENTION

The objects and purposes of the present invention are met by providing an internal combustionn engine, particularly in association with a vehicle, and having a turbine driven supercharger for supplying greater quantities of air to the intake manifold. The turbine is driven by a relatively closed fluid system which utilizes a combustible fuel, such as gasoline, as the working fluid. The fluid system includes a conventional fuel storage tank containing fuel therein, with fuel being withdrawn from the tank by a pump which is driven from the engine. The pump supplies pressurized fuel to the turbine for driving same, which in turn causes high speed rotation of the supercharger compressor. The fuel from the turbine is then returned to the tank. In one embodiment, the fuel used for driving the turbine is collected in an intermediate compartment which communicates, via a tube, with a venturi located in the intake manifold. Fuel form the compartment is drawn into the intake manifold and intermixed with the air for supply to the combustionn chambers of the engine. In another embodiment, the pressurized fuel from the pump is supplied directly to an injection jet located upstream of the compressor.

DETAILED DESCRIPTION

FIG. 1 illustrates therein a conventional internal combustion engine 11, such as a multiple cylinder engine of the type normally utilized on vehicles. The engine 11 includes a block or housing 12 having a plurality of bores formed therein, one bore 13 being illustrated in FIG. 2. A piston 14 is slidably positioned within the bore 13 and is connected by a conventional connecting rod 16 to a rotating crankshaft 17. The piston 14, in conjunction with the housing 12, defines a combustion chamber 18 which communicates with an exhaust passage 19 and an intake passage 21. The intake passage 21 in turn communicates with a conventional intake manifold 22 having a movable throttle plate 23 associated therewith. Air is supplied to the manifold 22 through a convential air cleaner 24.

Figure 2:
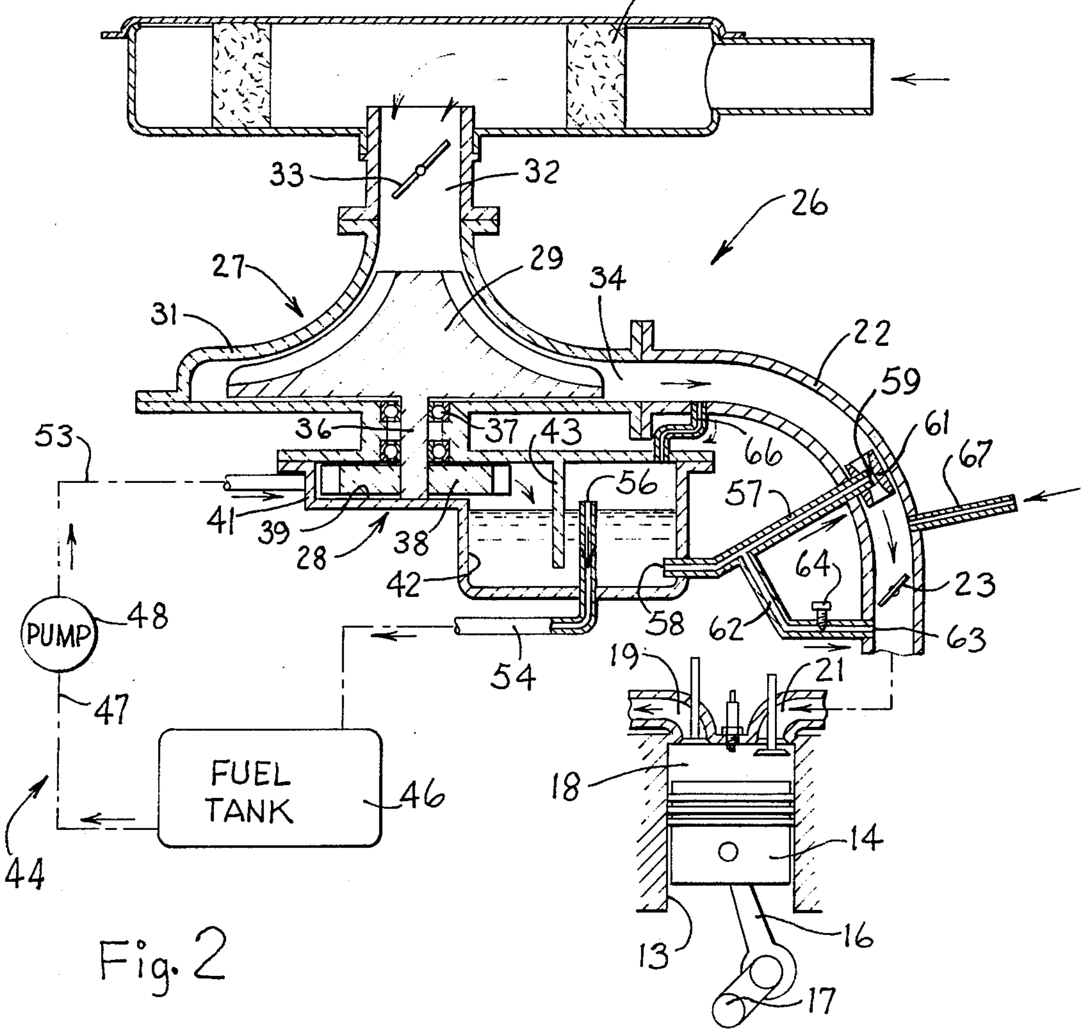
FIG. 2 is a broken, sectional, side elevational view illustrating the improved supercharger system of the present invention.

The engine 11 has an improved supercharger system 26 associated therewith which, as illustrated in FIG. 2, includes a compressor 27 driven by a turbine 28. The compressor 27 includes a rotatable bladed impeller 29 rotatably suppported within a hoursing 31. The housing has an intake passage 32 which is coaxially aligned with the inlet end of the impeller 29. The passage 32 has a conventional choke plate 33 therein. The impeller housing 31 has a discharge opening 34 formed therein which communciates with the intake manifold 22.

The impeller 29 has a rotatable drive shaft 36 fixedly secured thereto, which shaft is rotatably supported on housing 31 by conventional antifriction bearings 37. The turbine 28 includes a bladed turbine wheel 38 fixedly secured to the lower end of the shaft 36 and disposed within a compartment 39 defined within the interior of a housing 41. The housing 41 also defines an interior chamber 42 which is in open communication with the compartment 39 but is disposed at an elevationn below the compartment 39. The housing 41 also has a baffle 43 which projects downwardly into the chamber 42 and terminates a slight distance from the bottom wall of the chamber.

The turbine wheel 38 is driven by a substantially closed fluid system 44 which, as illustrated in FIG. 2, includes a tank or reservoir 46, which tank normally comprises a conventional fuel storage tank as associated with a vehicle. The tank 46 contains therein a quantity of an incompressible combustible fuel, such as gasoline. The fuel from tank 46 is supplied through conduit 47 to a pump 48, which pump is driven by a shaft 49 which, as illustrated in FIG. 1, has a pulley 51 on the end thereof. The pulley 51 is driven by a belt 52 which is drivingly coupled to the engine crankshaft. The pump 48 supplies pressurized liquid fuel to a supply conduit 53 which terminates in a jet which is fixed to the housing 41 and directs the fuel inwardly onto the blades associated with the turbine wheel 38 so as to rotatably drive same.

The fuel which is used for rotatably driving the turbine wheel 38 is discharged from the compartment 39 into the chamber 42, whereupon the fuel collect within the chamber 42 until reaching a preselected height. To permit removal of fuel from the chamber 42, there is provided a drain conduit 54 fixed to the housing 41 and projecting upwardly into the chamber 42. The upper end of the conduit 54 has an inlet opening 56 formed therein. The drain line 54 is connected to the fuel tank 46 for permitting the fuel to be returned thereto.

To provide for the supply of fuel to the inflowing air, the present invention also includes a fuel supply tube 57 which has an inlet opening 58 at the one end thereof, which opening communicates with the lower portion of the chamber 42 so as to be in continuous communication with the fuel trapped therein. The tube 57 has a discharge opening 59 at the other end thereof which is located in association with a conventional venturi 61 disposed within the intake manifold 22. The venturi 61, as illustrated in FIG. 2, is located upstream of the throttle plate 23. To permit proper idling of the engine when the throttle plate is substantially closed, there is additionally provided an idle passage 62 having a discharge opening 63 which communicates with the intake manifold 22 at a location disposed downstream of the throttle plate. The idle passage 62 can have an adjustment screw 64 associated therewith for controlling the fuel feed under idle conditions.

The system illustrated in FIG. 2 is also preferably provided with a balance passage 66 providing communication between the intake manifold 22 and the upper portion of the chamber 42 so that the pressure of the atmosphere above the fuel will be balanced with the pressure within the intake manifold.

If desired, the supercharger system illustrated in FIG. 2 can also be provided with a water injection jet 67 in communication with the discharge manifold 22, which jet can be supplied with pressurized water and controlled in a conventional manner.

OPERATION

The operation of the present invention will be briefly described to insure a complete understanding thereof.

The fuel, namely gasoline, is withdrawn from tank 46 through the conduit 47 for supply to the pump 48, which in turn pressurizes the fuel and supplies same to the conduit 53. The conduit 53 discharges the pressurized fuel against the blades of the turbine wheel 38, thereby causing high speed rotation thereof. The fuel used to drive the turbine wheel 38 is discharged into the chamber 42. When the fuel in chamber 42 reaches the level of the inlet opening 56, then the fuel flows through the pipe 54 to the tank 46.

The rotation of turbine wheel 38 causes a corresponding high speed rotationn of the compressor 29. Air is drawn through the intake passage 32 and supplied to the inlet end of the compressor 29 which, causes centrifugal pressurization of the air as it is supplied to the intake manifold 22. The high velocity air flowing through the venturi 61 causes fuel to be drawn from chamber 42 through the tube 57, which fuel is discharged at 59 into the venturi 61 so as to be dispersed and intermixed with the inflowing air. The resulting fuel-air mixture then flows past the throttle plate 23 and is supplied through one of the intake passages 21 into a combustion chamber 18, whereupon the mixture is ignited to cause a powered reciprocation of the piston 14 in a conventional manner.

Figure 3:
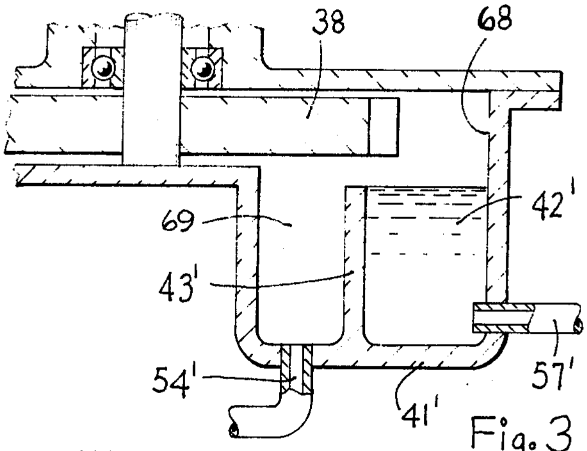
FIG. 3 is a fragmentary sectional view of a modified structure.

FIG. 3 illustrates therein a modification of the structure of FIG. 2, which modificaiton operates in substantially the same manner as FIG. 2. Particularly, the fuel which is discharged from the rotary turbine wheel 38′ is thrown against the side wall 68 of the housing 41′, whereupon the fuel drops downwardly so as to collect within the chamber 42′. The tube 57′ communicates with this chamber 42′ for permitting fuel to be drawn into the intake manifold in the same manner illustrated in FIG. 2. The housing 41′ also has a divider 43′ projecting upwardly from the bottom wall thereof, which divider 43′ is positioned below the turbine wheel 38′. When the fuel level within chamber 42′ reaches the upper edge of the divider 43′, the fuel spills over the upper edge of the divider into the drainage compartment 69, from which the fuel then drains into the line 54′ so as to be resupplied to the fuel tank. The remainder of the structure associated with the embodiment of FIG. 3, and the mode of operation of same, is in all other respects identical to the structure illustrated in FIG. 2.

The structure of the present invention, particularly illustrated in FIGS. 2 and 3, is highly desirable since it permits the fuel to be supplied to the intermixed with the inflowing air in a very efficient and desirable manner while eliminating the use of a conventional carburetor. While the fuel in the prsent invention is drawn through the tube 57 and supplied to the venturi 61 by conventional carburetion techniques, nevertheless the carburetion structure is substantially simplier than known structures since the present system does not require the use of float valves or the like for controlling fuel flow. At the same time, the present invention also permits the fuel to be used as the driving fluid for the turbine, which driving fluid constitutes an incompressible liquid so as to permit the use of a turbine wheel of relatively small size while at the same time permitting relatively large torques to be developed by the turbine wheel. Further, the use of a liquid, particularly fuel, for driving the tubine permits adequate driving of the turbine even under starting or low engine speeds since the system is not dependent upon a compressible gas nor is the system dependent upon the exhaust heat generated by the engine. Still further, by utilizing a readily available quantity of liquid, namely fuel supply, the turbine can be successfully driven without requiring the use of a separate fluid system. This thus results in the overall engine being more compact and economical.

MODIFICATIONS

Figure 4:
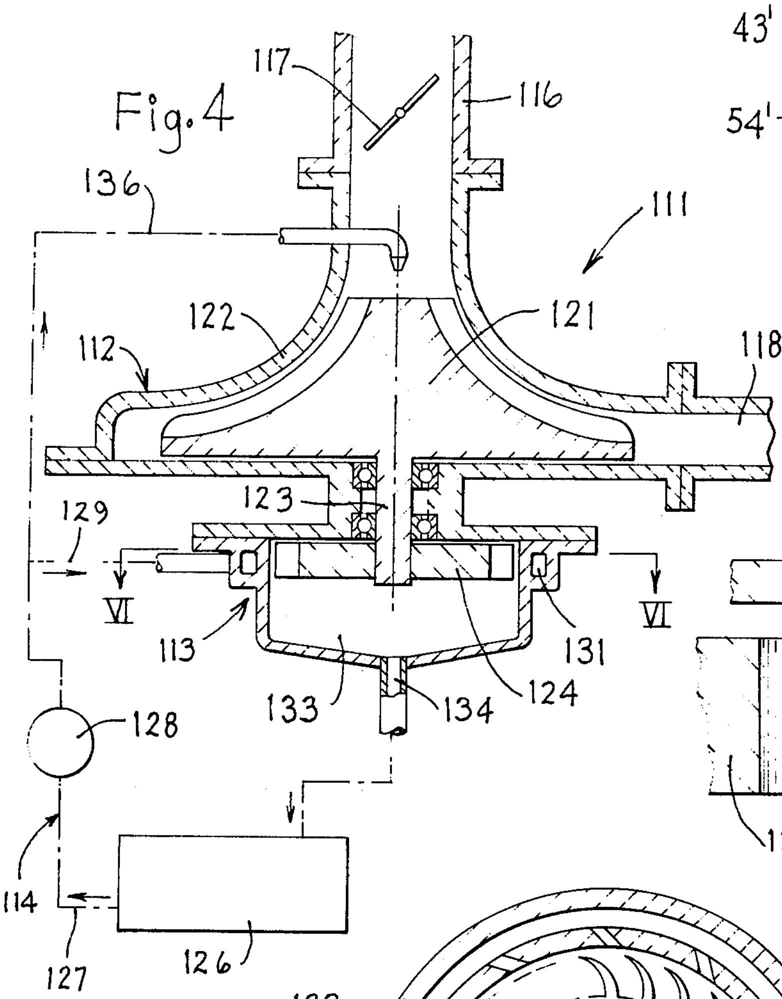
FIG. 4 is a view similar to FIG. 2 and illustrating a variation of the present invention.
Figure 5:
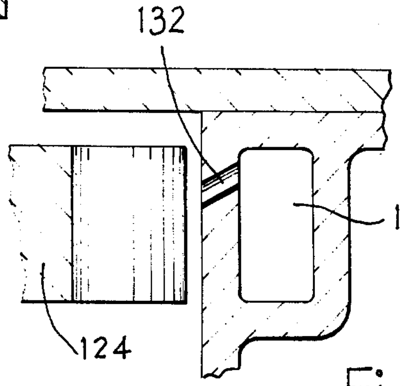
FIG. 5 is an enlarged, fragmentary, sectional view illustrating a portion of the drive turbine.
Figure 6:
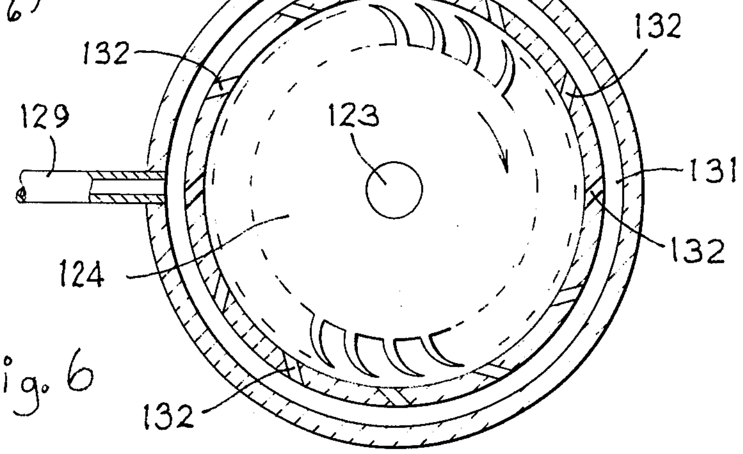
FIG. 6 is a sectional view taken along the line VI—VI in FIG. 4.

FIGS. 4–6 illustrate therein a modified supercharger system 111 which is usable with the internal combustion engine illustrated in FIG. 1. A majority of this modified system is similar to the system illustred in FIGS. 1 and 2 and thus same will only be briefly described.

Referring specifically to FIG. 4, same illustrates therein a rotary compressor 112 driven by a turbine 113, which turbine is driven by a substantially closed fluid system 114. The compressor has the inlet end thereof communicating with an intake passage 116 which contains a conventional movalbe throttle plate 117. The compressor 112 has the discharge end thereof communicating with the engine intake manifold 118. The compressor 112, as in the previously described embodiment, includes a bladed impeller 121 which is rotatably supported on the housing 122 and has a shaft portion 123 which extends downwardly and has the driving bladed turbine wheel 124 fixedly secured thereto. The turbine wheel 124 is driven by the fluid system 114 which, as illustrated in FIG. 4, includes a fuel tank 126 containing combustible fuel therein. Fuel is supplied via conduit 127 to a pump 128, the latter being driven by the engine. Pump 128 pressurizes the fluid and supplies same through the conduit 129 into an annular supply chamber 131 which is positioned in surrounding relationship to the turbine wheel 124. The pressurized fluid within chamber 131 is then discharged through a plurality of circumferentially spaced orifices or jets 132 so as to impinge on the blades of the turbine wheel 124, thereby rotating same.

In this embodiment, the fuel used for driving the turbine wheel 124 is collected within a chamber 133 which is located directly under the turbine wheel, which chamber permits the fluid to flow through the drain conduit 134 so as to be resupplied to the tank 126.

The plurality of orifices or jets 132 which are spaced circumferentially around the turbine wheel 124 results in the turbine wheel having several jets of fluid impinged thereon, thereby providing for quicker response and more efficient and uniform driving of the wheel 124. Further, the jets 132, as illustrated in FIG. 5, preferably extend downwardly at a slight angle relative to the radially extending direction of the turbine wheel so that the fuel will thus impinge against the blades of the wheel 124 and then pass freely downwardly between the blades so as to be deposited into the chamber 133.

The structure of FIGS. 4–6, as described above, could obviously incorporate therein a fuel feed tube for connection between the chamber 133 and the intake manifold 118 in the manner illustrated in FIG. 2, if desired.

However, FIG. 4 illustrates therein a further modification of the present invention wherein pressurized fuel is supplied directly from the pump 128 for injection into the air stream. For this purpose, the pump 128 communicates with a further conduit or passage 136 which terminates in a nozzle 137 located in the intake passage 117. The nozzle 137 is, located in the intake passage 116 at a position which is downstream of the throttle plate 117 but upstream of the compressor 121. The pump 128 causes fuel to be injected by the nozzle 137 into the inflowing stream of air which is supplied to the compressor 121. The high rotational speed of the compressor 121 causes both atomization of the fuel and a uniform mixing of same with the air as the fuel-air mixture passes through the compressor into the intake manifold 118. In this way, a very uniform fuel-air mixture can be provided for supply to the combustion chambers of the engine. Further, by injecting the fuel into the inflowing air at a location which is upstream of the compressor, the fuel tends to cool the inflowing air so that the mixture supplied to the combustion chamber is likewise cooler, which improves the combustion efficiency and substantially minimizes and reduces the production of exhaust pollutants.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exlcusive property or privilege is claimed are defined as follows:

1. In a supercharger system for an internal combustion engine, comprising:

- rotatable centrifugal compressor means having an inlet port for receiving a compressible gas and an outlet port for discharge of said gas;
- rotatable turbine means connected to said compressor means for rotatably driving same, said turbine means including a rotatable turbine wheel;
- tank means for containing therein a supply of a substantially incompressible combustible fuel;
- conduit means defining therein a passage providing communication between said tank means and said turbine means, said passage having nozzle means associated with the discharge end thereof for directly said fuel against said turbine wheel to rotatably drive same;
- means for pressurizing the fuel and for supplying same to said nozzle means; and
- drain means associated with said turbine means for collecting the fuel supplied to said turbine wheel.

2. A system according to claim 1, including manifold means communicating with the outlet port of said compressor means, said drain means including wall means defining a fuel collecting chamber disposed in communication with said turbine wheel for collecting therein the fuel discharged from said turbine wheel, said wall means including means associated therewith for permitting fuel to collect within said chamber to a preselected height, first passage means providing communication between said chamber and said manifold means for permitting fuel to be withdrawn from said chamber into said manifold means for intermixing with the gas flowing therethrough, and second passage means communicating with said chamber for draining the excess fuel therefrom when the fuel level in said chamber exceeds said preselected height.

3. A system according to claim 2, wherein said second passage means communicates with said tank means.

4. A system according to claim 2, wherein said manifold means has venturi means associated therewith, and wherein one end of said first passage means communicates with said venturi means.

5. A system according to claim 1, further including first manifold means providing a first passageway communicating with said inlet port and second manifold means defining a second passageway communicating with said outlet port, and second nozzle means associated with one of said manifold means for injecting fuel into its respective passageway, said second nozzle means being connected in fluid communication with said tank means.

6. A system according to claim 5, wherein there is provided further conduit means connected between said second nozzle means and said tank means whereby said further conduit means supplies pressurized fuel to said second nozzle means.

7. In an internal combustion engine having a housing defining a compartment, a piston slidably disposed within said compartment and cooperating with said housing for defining a combustion chamber, an intake manifold in communication with said combustion chamber for supplying a fuel-air mixture thereto, a centrifugal compressor having an outlet opening communicating with said intake manifold, a supply manifold communicating with an inlet opening associated with said compressor for supplying air thereto, a rotatable turbine disposed in a turbine compartment and connected to said centrifugal compressor for rotating same, and a storage tank for containing therein a substantially incompressible combustible fuel, the improvement comprising supply conduit means connected between said tank and said turbine and defining a passage for permitting flow of fuel from said tank to said turbine compartment, said supply conduit means terminating in nozzle means for discharging fuel against said turbine for rotatably driving same, pump means associated with said supply conduit means for pressurizing said fuel and for causing said pressurized fluid to be discharged through said nozzle means, and means for removing the fuel from said turbine compartment.

8. An engine according to claim 7, wherein said turbine includes housing means defining therein said turbine compartment, said turbine including a rotatable turbine wheel disposed within said turbine compartment, said housing means further including a fuel collecting chamber disposed in communication with said turbine compartment and having means associated therewith for permitting fuel as discharged from said turbine wheel to collect within said chamber to a preselected depth, and further conduit means providing communication between said chamber and one of said manifolds for permitting supply of fuel thereto.

9. An engine according to claim 8, wherein said intake manifold includes a movable throttle plate associated therewith, and said further conduit means communicating with said intake manifold at a location disposed upstream of said throttle plate, said intake manifold futher including venturi means associated therewith and said further conduit means having the discharge end thereof communicating with said venturi means, and said removing means including drain means providing communication between said chamber and said tank.

10. An engine according to claim 7, further including second nozzle means communicating with said supply manifold, and flow passage means providing communication between said second nozzle means and said pump, means whereby said second nozzle means injects fuel into the stream of inflowing air which is supplied to said compressor.

* * * * *

UNITED STATES PATENT AND TRADEMARK OFFICE

CERTIFICATE OF CORRECTION

PATENT NO. : 3 935 847

DATED : February 3, 1976

INVENTOR(S) : Joseph A. Gamell

It is certified that error appears in the above-identified patent and that said Letters Patent are hereby corrected as shown below:

Column 7, lines 23-24; change "directly" to ---directing---.

Column 8, line 58; change "pump, means" to ---pump means, ---.

Signed and Sealed this

*eleventh* Day of *May 1976*

[SEAL]

*Attest:*

RUTH C. MASON
*Attesting Officer*

C. MARSHALL DANN
*Commissioner of Patents and Trademarks*